US006961761B2

(12) United States Patent
Masuyama et al.

(10) Patent No.: US 6,961,761 B2
(45) Date of Patent: Nov. 1, 2005

(54) SYSTEM AND METHOD FOR PARTITIONING A COMPUTER SYSTEM INTO DOMAINS

(75) Inventors: Kazunori Masuyama, San Jose, CA (US); Patrick N. Conway, Los Altos, CA (US); Hitoshi Oi, San Jose, CA (US); Jeremy Farrell, Campbell, CA (US); Sudheer Miryala, San Jose, CA (US); Yukio Nishimura, Cupertino, CA (US); Prabhu Murthy, San Jose, CA (US)

(73) Assignee: Fujitsu Limited, Kawasaki (JP)

( * ) Notice: Subject to any disclaimer, the term of this patent is extended or adjusted under 35 U.S.C. 154(b) by 691 days.

(21) Appl. No.: 09/861,293

(22) Filed: May 17, 2001

(65) Prior Publication Data

US 2002/0184345 A1 Dec. 5, 2002

(51) Int. Cl.[7] .............................................. G06F 15/177
(52) U.S. Cl. ........................ 709/220; 709/229; 709/221; 709/222; 710/8; 710/14
(58) Field of Search ................................. 709/220, 229, 709/221, 222; 710/8, 14

(56) References Cited

U.S. PATENT DOCUMENTS

| 5,175,839 | A | 12/1992 | Ikeda et al. |
|---|---|---|---|
| 5,465,338 | A | 11/1995 | Clay |
| 5,561,780 | A | 10/1996 | Glew et al. |
| 5,592,671 | A | 1/1997 | Hirayama |
| 5,727,150 | A | 3/1998 | Laudon et al. |
| 5,761,460 | A | 6/1998 | Santos et al. |
| 5,829,032 | A | 10/1998 | Komuro et al. |
| 5,859,985 | A | 1/1999 | Gormley et al. |
| 5,887,134 | A | 3/1999 | Ebrahim |
| 6,006,255 | A | 12/1999 | Hoover et al. |
| 6,014,669 | A | * 1/2000 | Slaughter et al. .............. 707/10 |
| 6,014,690 | A | 1/2000 | VanDoren et al. |
| 6,026,472 | A | 2/2000 | James et al. |
| 6,092,213 | A | * 7/2000 | Lennie et al. ................... 714/3 |
| 6,163,855 | A | * 12/2000 | Shrivastava et al. ........... 714/4 |
| 6,725,261 | B1 | * 4/2004 | Novaes et al. .............. 709/220 |
| 2002/0078263 | A1 | * 6/2002 | Darling et al. .............. 709/331 |
| 2002/0184345 | A1 | 12/2002 | Masuyama et al. |
| 2002/0186711 | A1 | 12/2002 | Masuyama et al. |
| 2003/0005070 | A1 | 1/2003 | Narasimhamurthy et al. |
| 2003/0005156 | A1 | 1/2003 | Miryala et al. |
| 2003/0007457 | A1 | 1/2003 | Farrell et al. |
| 2003/0007493 | A1 | 1/2003 | Oi et al. |
| 2003/0023666 | A1 | 1/2003 | Conway et al. |
| 2004/0199680 | A1 | * 10/2004 | Shah .......................... 710/36 |

OTHER PUBLICATIONS

Abandah, Gheith A., and Davidson, Edward S., Effects of Architectural and Technological Advances on the HP/Convex Exemplar's Memory and Communication Performance, IEEE 1998—1063–6897, pp. 318–329.

(Continued)

Primary Examiner—Jeffrey Gaffin
Assistant Examiner—Niketa Patel
(74) Attorney, Agent, or Firm—Fenwick & West LLP (57) ABSTRACT

A domain partitioning system for a multi-node computer system is disclosed. An external server manager is coupled to a domain configuration unit by a dedicated sideband channel. The server manager has write privileges to the domain configuration unit that allows the server manager to control the domain partitioning and the routing tables. None of the domains of the computer system are permitted write access to the domain configuration unit. In one embodiment, the domain configuration unit is a set of domain partition registers and routing table registers coupled to a system interconnect.

23 Claims, 4 Drawing Sheets

OTHER PUBLICATIONS

Falsafi, Babak and Wood, David A., Reactive NUMA: A Design for Unifying S–COMA and CC–NUMA, ISCA '97., CO, USA, pp. 229–240.

IBM. The IBM NUMA–Q enterprise server architecture. *Solving issues of latency and scalability in multiprocesor systems.* Jan. 19, 2000, 10 pages.

Lovett, Tom and Clapp, Russell; StiNG: A CC–NUMA Computer System for the Commercial Marketplace; ISCA '95, PA, USA, pp. 308–317.

Unisys White Paper. *Cellular Multiprocessing Shared Memory: Shared Memory and Windows*, Sep. 2000, pp. 1–16.

Servers White Paper. *Sun Enterprise™ 10000 Server: Dynamic System Domains*. Sun Microsystems, Inc., Palo Alto, CA, USA. 2001. [retrieved on Apr. 1, 2001]. Retrieved from the internet:<URL:http://www.sun.com/servers/white-papers/domains.html?pagestyle=print>.

Geralds, John, in Silicon Valley. *Sun enhances partitioning in Starfiew Unix server*, 1999 VNU Business Publishing Limited [retrieved on Apr. 11, 2001]. Retrieved from the internet:<URL:http://www.vnunet.com/print/104311>.

Willard, Christopher, an IDC White Paper. *Superdome— Hewlett–Packard Extends Its High–End Computing Capabilities*. pp. 1–20 (2000).

\* cited by examiner

SYSTEM AND METHOD FOR PARTITIONING A COMPUTER SYSTEM INTO DOMAINS

BACKGROUND OF THE INVENTION

1. Field of the Invention

The present invention relates generally to partitioning of a computer system into domains, and more particularly programming the domain configuration registers of a multi-node computer system into domains

2. Description of Background Art

Multi-node computer networks are often partitioned into domains, with each domain functioning as an independent machine with its own address space. An operating system runs separately on each domain. Partitioning permits the resources of a computer network to be efficiently allocated to different tasks, to provide flexibility in the use of a computer system, and to provide isolation between computer resources to limit the effects of hardware or software faults in one part of the network from interfering with the operation of the entire system.

Figure 1:
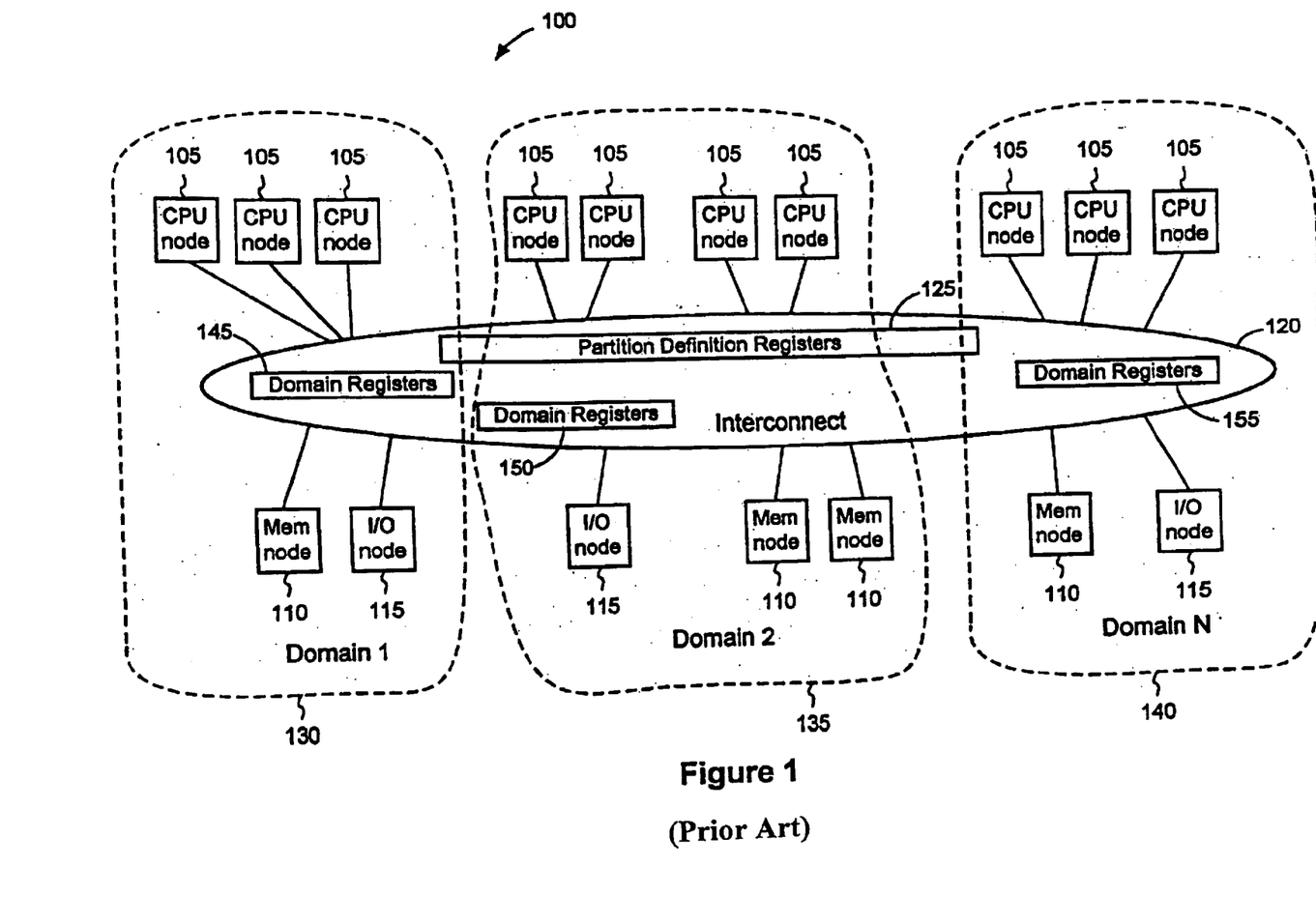

FIG. 1 shows an illustration of a multimode computer system including central processing unit (CPU) nodes 105, memory nodes 110, and input/output (I/O) nodes 115 coupled to a system interconnect 120. System interconnect 120 may include components, such as packet routers and/or crossbar switches, to permit partitioning of the system into domains, with each domain functioning as an independent computer system. Partition definition registers 125, also known as domain control registers, are used to partition the multimode system into domains 130, 135, 140 each having its own local domain registers 145, 150, 155. Routing tables are typically used to facilitate routing of messages within a domain. The local domain registers can include a variety of different types of conventional registers, such as configuration space registers, control registers, status registers and error logging registers.

However, conventional domain partitioning has the drawback that the domain partitioning can become deleteriously affected by software and hardware errors of any one domain. First, the software running in an individual domain 130, 135, or 140 may have a defect (a "bug") that results in one domain interfering with the operation of another domain, such as if a defect in the software of a domain 130 erroneously writes data into a location that interferes with the operation of another domain 135. Second, a malicious user (a "hacker") can intentionally input software code that corrupts the function of one domain or the domain partitioning. Third, a hardware fault may result in an individual domain failing, resulting in the entire system entering a nonfunctional state.

Therefore, there is a need for a domain partitioning system and method with improved control of domain partitioning.

SUMMARY OF THE INVENTION

A system and method is disclosed for domain partitioning of a computer system having a plurality of computer nodes coupled by a system interconnect. A domain configuration unit, coupled to the system interconnect, includes domain configuration registers defining a partition state of the computer system. None of the domains has write access privileges to the domain configuration registers. A server manager, distinct from the computer system, is coupled to the domain configuration unit by a dedicated communication channel and is adapted to write the partition state in the domain configuration unit. In one embodiment the server manager is a software application residing on a computer exterior to the computer system. The server manager preferably has both read and write access to the domain configuration registers. In one embodiment, the server manager also has write access to registers within local domains.

BRIEF DESCRIPTION OF THE DRAWINGS

FIG. ("FIG.") 1 is a block diagram of one embodiment of an overall architecture of a prior art multi-node network computer system.

The figures depict a preferred embodiment of the present invention for purposes of illustration only. One of skill in the art will readily recognize from the following discussion that alternative embodiments of the structures and methods disclosed herein may be employed without departing from the principles of the claimed invention.

DETAILED DESCRIPTION OF THE PREFERRED EMBODIMENTS

The present invention includes a system and a method for partitioning a multimode computer system into domains. FIG. (FIG.) 2 is a block diagram of one embodiment of an overall architecture of a multi-node network computer system 200 in accordance with the present invention. In accordance with the present invention, there is provided a multi-node computer system that includes a plurality of central processing unit (CPU) nodes 105, memory nodes 110, and input/output (I/O) nodes 115 coupled to a system interconnect 120. Each node may be implemented on a separate computer chip, computer board, or stand-alone unit. The system interconnect 120 may be, for example, a global interconnect, or include a router. Examples of applications of system 200 include server applications, e.g., system 200 may be a server.

Figure 2:
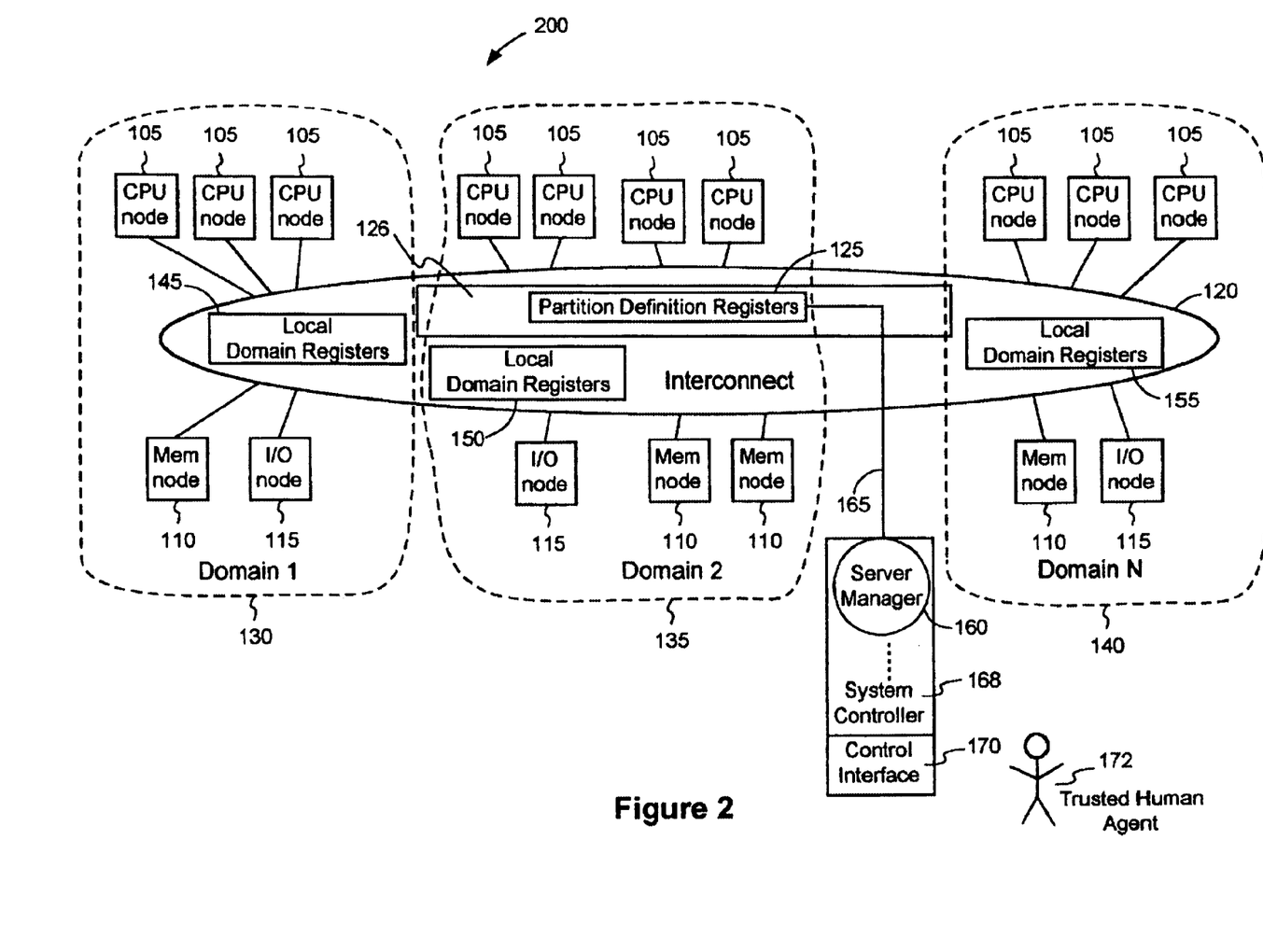
FIG. 2 is a block diagram of an overall architecture of a multi-node computer system in accordance with the present invention.

In one embodiment, a domain configuration unit 126 includes domain configuration registers 125 and routing table registers (not shown in FIG. 2). Domain configuration registers 125 (which can also be described as partition definition registers) are used to partition computer system 200 into domains 130, 135, 140. Each domain has its own local domain registers 145, 150, 155 controlling the state of the local domain. The local domain registers can include a variety of different types of local registers, such as control registers, status registers and error logging registers. For the purposes of illustration, three domains are shown but more generally two or more domains (e.g., 1, 2, 3, 4 . . . ) may be formed by domain configuration registers 125.

A Server manager 160 is coupled to the write ports of a domain configuration unit that includes domain configuration registers 125. The coupling to the write ports is preferably made by a dedicated sideband channel 165, i.e., by a data channel that cannot be corrupted by software or hardware errors in an individual domain. Channel 165 is thus a channel preferably reserved for use by server manager 160.

For example, channel 165 may be implemented in hardware as a dedicated data bus. Alternately, channel 165 may be a dedicated data channel that is incorruptible by communications carried by other channels on the same data bus. Some other desirable characteristics of a dedicated sideband channel are: 1) the sideband channel does not share hardware resources with the domains; 2) the occurrence of deadlock, livelock or starvation within a domain does not affect communication on the sideband channel; 3) the sideband channel has one master, the Servermanager; and 4) the sideband channel is never blocked.

Server manager 160 may be implemented as hardware, software, firmware and combinations thereof. Server manager 160 may be part of a system controller 168 having a control interface 170 for system administrator 172 (a "trusted human agent"). The system controller 168 preferably acts to configure, monitor and control the larger system 200. As shown in FIG. 2, in one embodiment, there is a control interface, 170 for a human user, a Trusted Agent 172, to control the operation of computer system 200. For example, system controller 168 may be a PC or workstation having a graphical user interface for a user to enter commands to a server manager 160 that is a software module residing on local memory of the PC or workstation. As described below in more detail, in one embodiment, server manager 160 also has read and write access to control registers within local domains. This permits a server manager 160 to be used to change the mode of operation of individual domains, such as to quiesce the domains as part of a reconfiguration process.

Server manager 160 operates independently of the hardware or software running on any individual domain. Thus, as described below in more detail, server manager 160 is not affected by hardware or software faults in any individual domain of the computer system 200. Server manager 160 has write access to write a partition state (i.e., a mapping determining the nodes that belong to each of a selected total number of domains) in the domain configuration registers.

Figure 3:
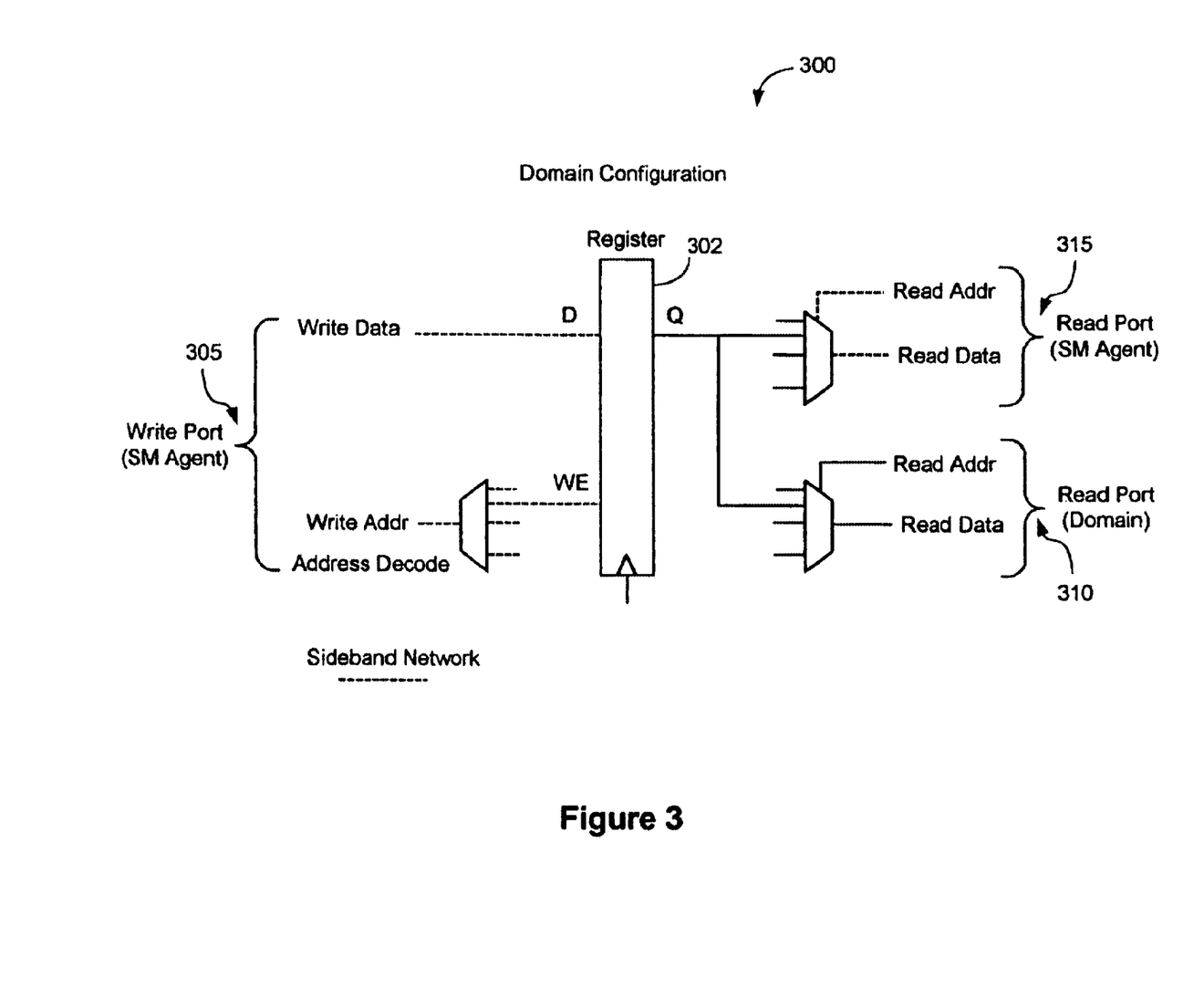
FIG. 3 is an illustrative diagram of a domain configuration register of FIG. 2.

FIG. 3 is a block diagram showing a preferred hardware implementation of an individual domain configuration register 300 in accord with the present invention. Server manager 160 is coupled to the write access port 305 of each domain configuration register 302 by the dedicated sideband channel and has write access privileges. Server manager 160 is also preferably coupled to the read port of each domain configuration register 302 such that in a preferred embodiment server manager 160 has both read and write privileges to each configuration register. In contrast, the local domains are not coupled to the write port of the domain configuration registers. As shown in FIG. 3, an individual domain may be coupled to a read port 310 of domain configuration register 300. The server manager also preferably has read access via a read port 315 to each domain configuration register.

In a preferred embodiment, the server manager 160 has both read and write access privileges to one or more local domain registers in each domain, such as control registers, status registers, and domain configuration registers. This has the benefit that it permits the server manager to be used to monitor and control the state of each individual domain, such as by monitoring and writing to domain configuration and control registers. Note that a local domain preferably has read and write access only to the local registers of its domain. In one embodiment, a domain may be given read access to the local domain registers of the other domains of system 200. Domain read/write access rights to local domain registers are programmable by the server manager and are enforced by the address map and the routing table. The address map and routing table can be combined. Whenever a domain attempts to access a register, the address map and routing table are accessed to determine what the access rights are and how to route the packet. If the access rights do not allow the access, the access attempt fails and an error is reported.

Table 1 summarizes the read and write access privileges of a preferred embodiment of the present invention.

TABLE I

Read and Write Privileges of Selected Registers

| Registers | Domain Read Access | Domain Write Access | Server manager Read Access | Server manager Write Access |
|---|---|---|---|---|
| Domain Configuration Registers | Yes. | No. | Yes. | Yes. |
| Other (local) domain registers | Yes. | Yes. | Yes. | Yes. |

As previously described, each domain has its own address space. Register addresses are mapped within an address space. Examples of techniques to map register addresses to an address space include memory mapping using windows defined by {base, limit} address pairs or mapping to an entirely separate address space for register access, such as peripheral component interface (PCI). Conventional memory mapping includes processes for managing I/O devices in which interface registers of devices are assigned memory addresses. Memory mapping is the definition of windows(s) within the coherent address space of a computer/domain such that read/write accesses to that region does not access memory but I/O controllers i.e. those addresses are "mapped" to I/O controllers. For example, these I/O controllers could be Peripheral Component Interconnect (PCI) fibre channel controllers or PCI Ethernet controllers.

Figure 4:
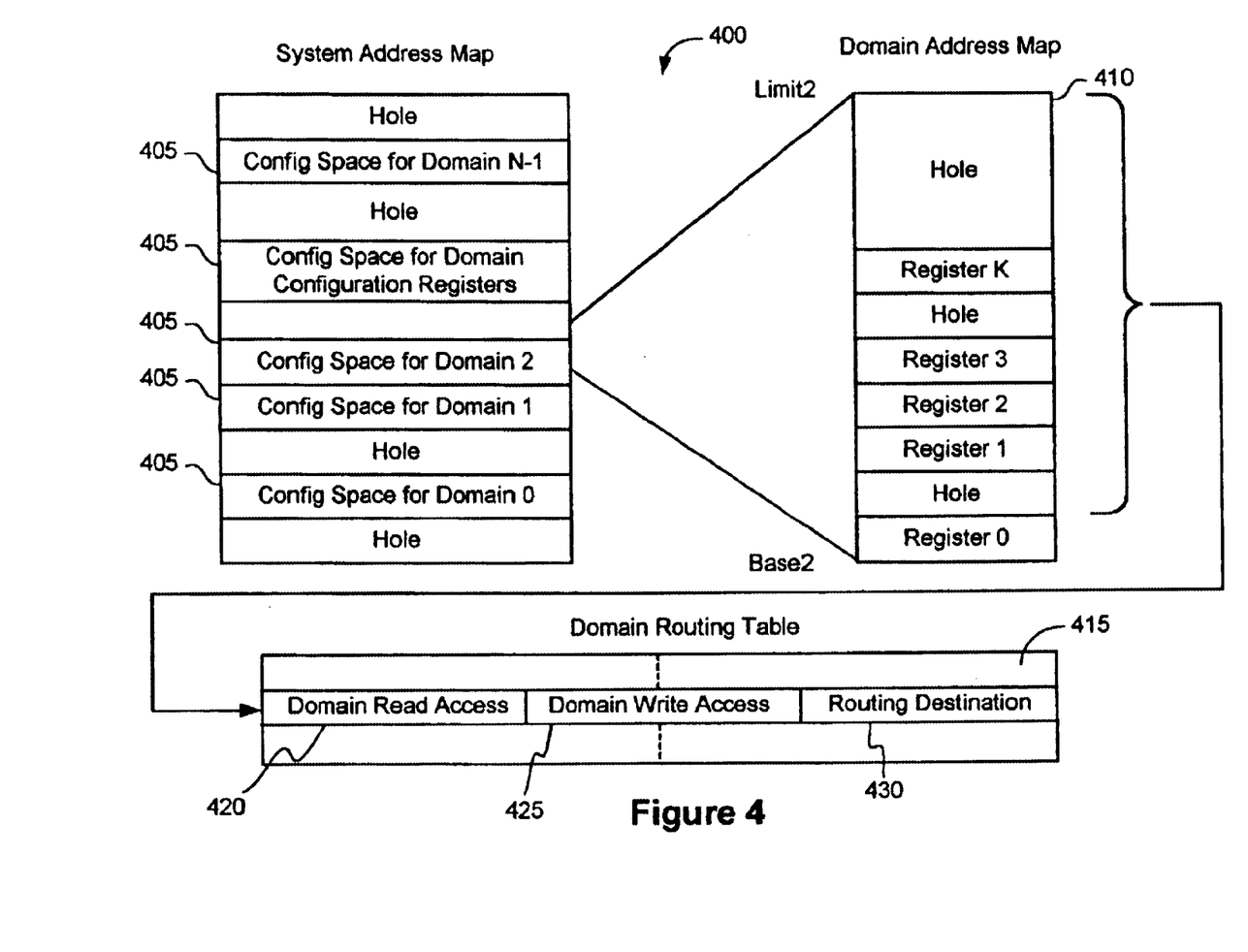
FIG. 4 is a diagram illustrating a system address map and routing table for implementing the domain partitioning of the system of FIG. 2.

FIG. 4 shows an example of system address map 400 with memory mapped register windows. The system address map 400 includes a configuration space window 405 for each domain. Each configuration space window is identified by an identifier, called the register configuration space identifier. An individual configuration space 405 includes a domain address map 410 and an associated routing table 415. The routing table includes routing information and access control information for groups of registers. The routing table 415 is indexed by a register configuration space identifier, which value is given by the memory mapped register window The domain read access field 420 of routing table is a list of domain that have read access for the groups of registers governed by routing table 415. As one example, the domain read access field 420 could be implemented as a bit vector with a bit set to "1" for each domain that has read permission and set to "0" for each domain that does not have read permission. Note that domain read access field 420 is optional. If the field is absent, the default is that every domain has read access.

Domain write access field 425 of domain routing table 415 is a list of domains that have write access to the local domain registers (i.e., local domain registers 145, 150, and 155) governed by the domain routing table 415. In one embodiment, the domain write access field 425 is a bit vector set for each domain that has write permission, e.g., the bit vector could be set to "1" for each domain that has write access permission and to "0" for each domain that does not have write access permission. The field is optional. If the field is absent, the default is that only the local domain has write permission unless the register is a domain configuration register, in which case no domain has write permission.

The routing destination field 430 defines how requests in the window defined by {base2, limit2} are handled. The routing destination field 430 is a required field. An access attempt to an undefined window is trapped and treated as an access control violation.

The routing table 415 is in the configuration space for domain configuration registers window 405 of the system address map 400. Note that no domain has write access to the routing table 415. Only the server manager 160 can write to the routing table.

One benefit of the server manager 160 and dedicated sideband channel 165 of the present invention is that it enforces domain isolation and prevents one domain from interfering with the operation of another domain. Because the routing tables are in the Domain Configuration unit 126, it is not physically possible for any message originating in one domain to route to a destination in another domain. The hardware configuration excludes any one individual domain from changing the domain partitioning.

Another benefit of the present invention is that is permits dynamic configuration, such as when there is change in node hardware, such as when a CPU node, 105, memory node 110, or I/O node 115 is added to or removed from computer system 120. The server manager 160 may be used to quiesce the computer system 200 due to its control over local registers. The server manager 160 quiesces the computer system 200 by putting the computer system 200 into a mode (the so-called "chipset drain mode") in which no new transactions are accepted and all outstanding transactions in all domains run to completion. After the system is quiesced, hardware changes can be made to computer system 200. The domain configuration registers are then updated using the server manager 160. Normal operation of the computer system is recommenced (e.g., chipset drain mode terminated Still another benefit of the present invention is that server manager 160 has the capability to reset the domain state of a deadlocked domain. If a hardware fault occurs within a domain, the domain can become deadlocked due to the domain interconnection network being deadlocked. In a conventional computer system 100, deadlocked domains have the capability to cause errors in the operation of other domains due to resource sharing across domains. In the present invention, however, server manager 160 has a dedicated channel 165 to selectively reset the hardware state in a deadlocked domain. Additionally, since a local domain does not have write access to the domain configuration registers 125, errors are contained within the domain that had the hardware fault. Similarly, server manager 160 has the capability to reset the state of a domain which is inoperative due to livelock or starvation.

While particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. A computer system, comprising:
   a system interconnect coupling a plurality of computer nodes;
   a domain configuration unit coupled to the system interconnect recording a partition state for partitioning the computer system into a plurality of domains, none of the domains having write access to the partition state recorded in the domain configuration unit; and
   a server manager coupled to the domain configuration unit by a communication channel, the server manager adapted to write the partition state in the domain configuration unit.

2. The system of claim 1, wherein the domain configuration unit comprises a plurality of domain configuration registers.

3. The system of claim 2, wherein the domain configuration registers each have read and write ports, and the server manager is communicatively coupled to the write port of each domain configuration register.

4. The system of claim 1, wherein the server manager is communicatively coupled to the write port of at least one register in each domain that is not associated with defining the partition state.

5. The system of claim 4, wherein the at least one register is selected from the group consisting of: status registers, control registers and error logging registers.

6. The system of claim 5, wherein the server manager is coupled to a user interface for monitoring and controlling the domain partitioning of the computer systems.

7. A computer system, comprising:
   a system interconnect coupling a plurality of computer nodes into a computer network, the computer nodes including CPU nodes, memory nodes, and I/O nodes;
   a plurality of domain configuration registers coupled to the system interconnect, the domain configuration registers defining a partition state of the plurality of computer nodes into a plurality of domains, each of the domains having a respective address space and at least one local domain register, none of the plurality of domains having write access privileges to the domain configuration registers; and
   a server manager communicatively coupled to the domain configuration definition registers by a dedicated communication channel, the server manager having write access privileges to the domain configuration registers.

8. The system of claim 7, wherein the server manager has read access and write access to the at least one local register of each domain.

9. The system of claim 7, wherein each domain configuration register further comprises:
   a read port coupled to at least one local domain and to the server manager; and
   a write port coupled to the server manager.

10. The system of claim 7, wherein the server manager is implemented as hardware.

11. The system of claim 7, wherein the server manager is implemented as firmware.

12. The system of claim 7, wherein the server manager is implemented as software residing on a computer external to the computer system.

13. The system in claim 7, wherein the server manager has read access and write access to the at least one local register of each domain.

14. The system of claim 8, wherein each domain has at least one register having a control state to quiesce the system coupled to the server manager, whereby the server manager may program the computer system into a quiescent state.

15. In a computer system, a method of partitioning the computer system into a plurality of domains using a server manager communicatively coupled by a dedicated sideband channel to a domain configuration unit, the method comprising:

selecting a domain partition state; and writing the domain partition state in the domain configuration unit with the server manager, wherein none of the domains have write access to the domain partition state.

16. The method of claim 15, wherein the domain configuration unit comprises a plurality of domain configuration registers defining the domain configuration.

17. The method of claim 15 wherein the server manager has read access and write access of at least one control register within each domain of the system, the method further comprising:

selecting a new system state; and writing at least one instruction for entering a new system state in the control registers.

18. The method of claim 17, wherein the new system state is a quiescent state.

19. The method of claim 17, wherein the new system state is a new configuration of at least one domain.

20. The method of claim 17, wherein the server manager has read access of at least one status register, the method further comprising:

detecting an inoperative domain in a deadlock, livelock or starvation state; and resetting the state of the inoperative domain.

21. In a computer system partitionable into a plurality of domains, a method of using a server manager having exclusive write access to domain configuration registers and read and write access to control registers within each domain to configure a domain, the method comprising:

programming the plurality of domain registers for the system to enter a quiescent state;

changing the physical configuration of the computer system;

updating the plurality of domain configuration registers; and programming the plurality of domain registers to resume normal operation.

22. In a computer system having a plurality of domains, a method of using an external server manager coupled to local domain registers in the each domain to respond to a hardware error deadlocking a portion of the system, the method comprising:

detecting a deadlocked domain; and resetting the local domain registers of the deadlocked domain.

23. The system of claim 3, wherein the domain configuration registers each have read and write ports, and the server manager is communicatively coupled to the write port of each domain configuration register through a dedicated sideband channel.

* * * * *

UNITED STATES PATENT AND TRADEMARK OFFICE
CERTIFICATE OF CORRECTION

PATENT NO.   : 6,961,761 B2
DATED        : November 1, 2005
INVENTOR(S)  : Kazunori Masuyama et al.

It is certified that error appears in the above-identified patent and that said Letters Patent is hereby corrected as shown below:

Column 6,
Lines 3 and 36, delete "none of".
Lines 4 and 37, insert -- never -- after "domains".
Lines 7 and 41, insert -- only -- after "channel,".
Line 8, insert -- exclusively -- before "adapted to".
Line 26, delete "systems" and insert -- system --.
Line 41, insert -- exclusive -- after "having".

Column 7,
Line 8, insert -- exclusively -- after "unit".
Line 8, delete "none of".
Line 9, insert -- never -- after "domains".

Column 8,
Line 1, delete "In a computer system partitionable" and insert
-- A method of partitioning a computer system --.
Lines 2-5, delete "a method of using a server manager having exclusive write access to domain configuration registers and read and write access to control registers within each domain to configure a domain,".
Line 6, insert -- establishing a server manager having exclusive write access to domain configuration registers, and read and write access to control registers within each domain to configure a domain, the domains never having write access to the domain configuration registors; -- before the word "programming".
Line 10, insert -- using the server-manager -- after "registers".
Lines 15-16, delete "of using an external server manager coupled to local domain registers in the each domain to respond" and insert -- for responding --.
Line 19, insert -- coupling an external server manager, having exclusive write access to domain configuration registers, to local domain registers through a dedicated channel in each of the plurality of domains; -- before the word "detecting".
Line 19, delete "and" after the words "deadlocked domain;".

UNITED STATES PATENT AND TRADEMARK OFFICE
CERTIFICATE OF CORRECTION

PATENT NO. : 6,961,761 B2
DATED : November 1, 2005
INVENTOR(S) : Kazunori Masuyama et al.

It is certified that error appears in the above-identified patent and that said Letters Patent is hereby corrected as shown below:

Column 8 (cont'd),
Line 21, delete "." and insert -- ; and updating the plurality of domain configuration registers using the external server manager, the plurality of domains never having write access to the plurality of domain configuration registers within each domain. --.

Signed and Sealed this

Sixteenth Day of May, 2006

JON W. DUDAS
*Director of the United States Patent and Trademark Office*